Aug. 25, 1959 G. W. ANDERSON ET AL 2,900,919
SEAL ASSEMBLY FOR CENTRIFUGAL PUMPS
Filed Feb. 1, 1957 2 Sheets-Sheet 1

INVENTOR
Gene W. Anderson
and Willis Babcock
BY
ATTORNEYS

Aug. 25, 1959

G. W. ANDERSON ET AL 2,900,919

SEAL ASSEMBLY FOR CENTRIFUGAL PUMPS

Filed Feb. 1, 1957

INVENTOR
Gene W. Anderson
and Willis Babcock

BY Dodge and Sons

ATTORNEYS

United States Patent Office 2,900,919
Patented Aug. 25, 1959

2,900,919
SEAL ASSEMBLY FOR CENTRIFUGAL PUMPS

Gene W. Anderson, Aurora, and Willis Babcock, Sugar Grove, Ill., assignors to The New York Air Brake Company, a corporation of New Jersey Application February 1, 1957, Serial No. 637,706

1 Claim. (Cl. 103—111)

This invention relates to seal assemblies for pumps of the rotary impeller type. Particularly it relates to a seal assembly for use with pumps of the type in which the impeller is mounted on an overhung shaft.

It is necessary that the impeller be carefully aligned with the housing so that it will run true. Adjustment to bring about this alignment is painstaking. It will be obvious that it is necessary to use sealing means between the pump casing and the rotary shaft. The useful life of such seals is commonly less than that of the pump. In the ordinary construction, in order to replace the seals, it is necessary to disconnect a shaft coupling, which means that the alignment of the shaft and the pump housing is disturbed.

The purpose of the present invention is to provide a unitary seal assembly which includes both the stationary and the rotary elements of the seal and which can be replaced without the necessity of disconnecting any shaft couplings or otherwise disturbing the alignment between the pump housing and the shaft, and also without the necessity of disconnecting any high pressure pipe connections.

It has been proposed in the past to provide rotary pumps of the overhung impeller type with a cover plate on the side wall from the casing remote from the driving motor, which closes an opening of larger diameter than the over-all diameter of the impeller of the pump. It will be seen that by this arrangement, the impeller can be removed from the end of the shaft without disturbing the mounting of the housing or the shaft. It has also been proposed to dimension the opening so that the pump shaft, its bearings, and seals can be removed as a unit.

According to the present invention, a similarly removable impeller is used and serves also as a means for confining the rotary element of the seal assembly against axial motion and rotation relatively to the shaft on which it is mounted. This rotary element comprises a sleeve which is confined, when in operative position, between a shoulder on the shaft and the hub of the impeller. The side wall of the pump casing nearer the motor is provided with an opening smaller than the opening in the opposite side wall and to which a flange, carried by the stationary element of the seal assembly, may be fastened. Thus, the stationary element of the seal assembly serves as a closure plate for the side wall of the casing nearer the motor as well as serving as the stationary portion of the seal assembly, and is removable through the opening in the other side wall of the pump casing. The seal assembly may include sealing means of various types. For example, it might be rotating ring type seal, or it might be a conventional packing gland. In either type of seal, the adapter and the sleeve of the seal assembly may be placed on or removed from the overhung pump shaft as an assembly. This is an important feature of the invention, because assembly of the parts of the seal prior to their being placed on the shaft is easier than it would be if assembled in place. It also permits factory assembly. This is true, regardless of the type of seal which is used. Also the presence of the sleeve in the assembly protects the sealing means against damage from careless handling by relatively untrained maintenance personnel.

The invention will be described having reference to the accompanying drawings, in which.

Figure 1:
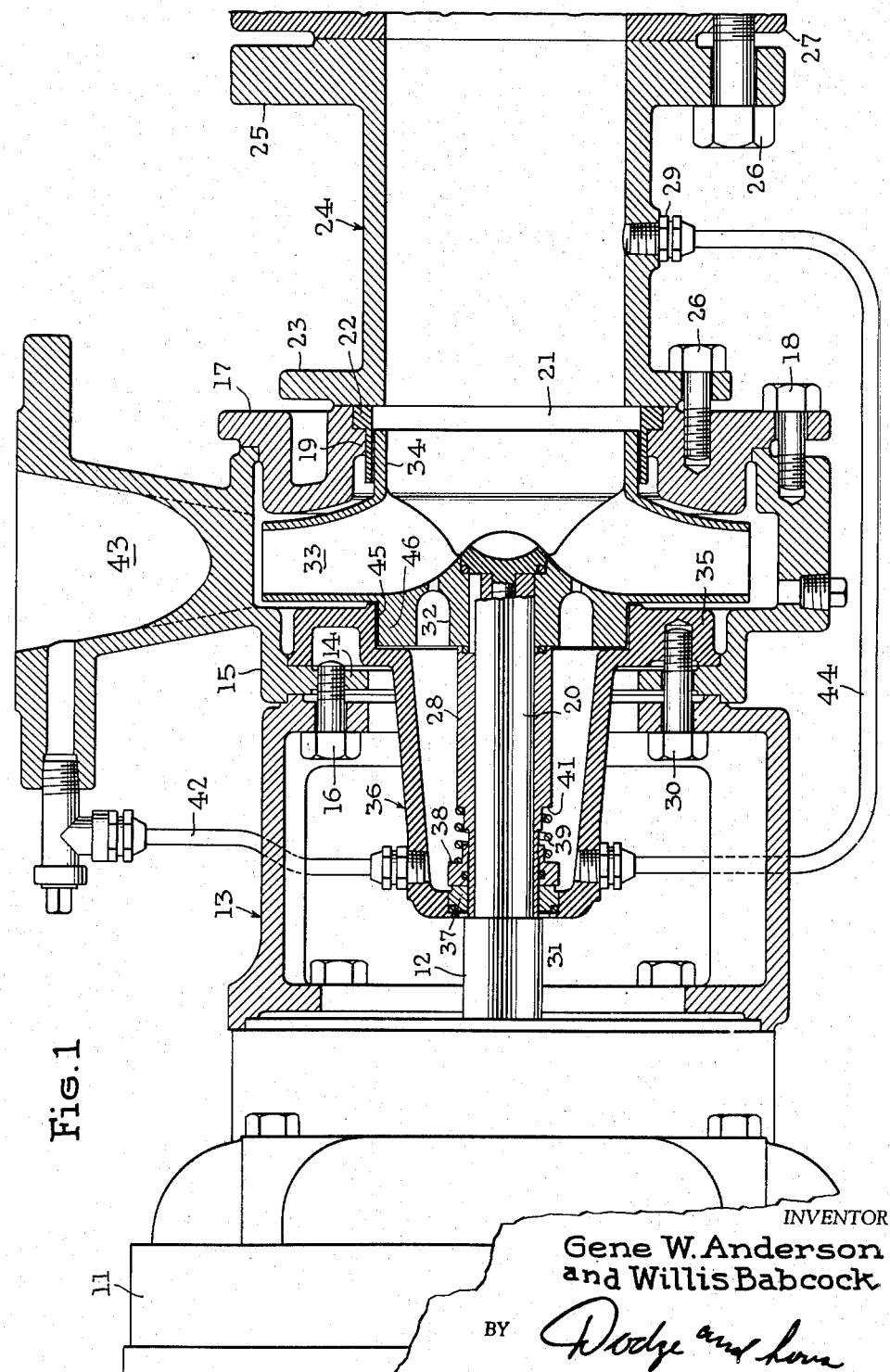
Fig. 1 is a fragmentary side elevation, partly in axial section, of an overhung motor-pump unit embodying the invention.

Refer first to Fig. 1. The motor-pump unit comprises a motor 11 having an overhung shaft 12. Connected to the motor is a mounting bracket 13 which, in turn, is fastened to the flanges 14 of the pump casing 15 by cap screws 16. A suction cover plate 17 extends into and closes the opening in the opposite side wall of the casing 15 and is secured in place by cap screws 18. The suction cover plate 17 is provided with a central opening having a shoulder 19. A wear ring 21 is slidable into the central opening and has an annular shoulder 22 which is confined between the shoulder 19 and the flange 23 of the removable suction coupling 24. The coupling 24 includes a flange 25 at its opposite end which is adapted to be fastened by means of cap screws 26 to the flange 27 on the suction piping (not shown). The mating surfaces of the flange 23 and the suction cover 17 are parallel with the mating surfaces of the flanges 25 and 27. Thus, it will be seen that the suction coupling 24 may be laterally withdrawn after the cap screws 26 have been removed and the pipe coupling 29 has been disconnected.

The overhung end of the shaft 12 is provided with a reduced diameter portion 20 which is encircled by a sleeve 28. One end of the sleeve 28 abuts against the shoulder 31 on the shaft 12 and the other end engages the hub 32 formed on the impeller 33. The impeller 33 is provided with a second hub 34 which has a free running fit with the wear ring 21. Within the impeller cavity in the casing 15 is a flange 35 of an adapter 36, of the form shown, which is fastened to the flange 14 by cap screws 30. The end of the adapter 36 adjacent the motor 11 carries a stationary sealing ring 37 having an annular sealing face against which is biased a rotary sealing ring 38. The sealing ring 38 rotates relatively to the ring 37 but is held against rotation on the sleeve 28 by which it is carried. A spring 39 reacts between the ring 38 and the shoulder 41 formed on the sleeve 28.

At its end adjacent the impeller 33, the adapter 36 is provided with a cylindrical surface 45 which has a free runnnig fit with the hub 46 of the impeller 33 and which surface 45 serves as a secondary wear ring similar to the wear ring 21.

Cooling and lubricating fluid may be supplied to the interior of the adapter 36 by means of a flow connection 42 leading from the discharge passage 43 of the pump and having a flow capacity small compared to that of the pump. Fluid is returned from the interior of the adapter 36 to the suction side of the pump by means of a flow connection 44. The flow connections 42 and 44 are not necessary in all installations and may be omitted if desired.

Figure 3:
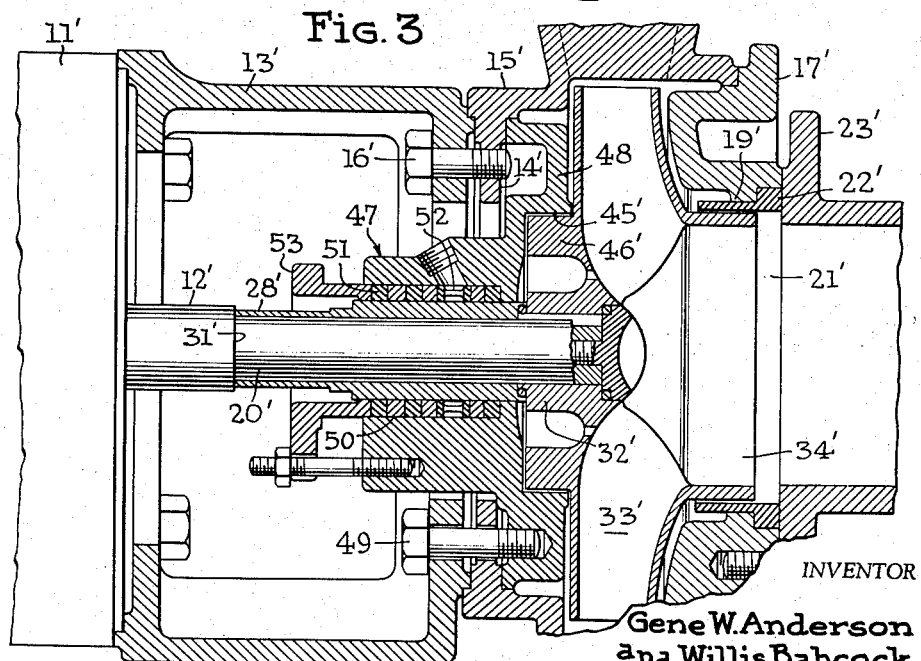
Fig. 3 is a fragmentary side elevation, partly in axial section, showing a motor-pump unit embodying the invention, using a seal of a different type from that shown in Fig. 1.

Refer now to Fig. 3 and the modification there shown. Parts in this modification which are identical with the parts in the embodiment illustrated in Fig. 1 are indicated by the same reference numeral used in Fig. 1 followed by the symbol prime.

It will be apparent that the seal assembly comprises a sleeve 28' mounted on the shaft 12' in exactly the same manner as the sleeve 28 was mounted. The seal assembly also includes an adapter 47 including a flanged portion 48 fastened to the flange 14' by cap screws 49. Flanged portion 48 includes a cylindrical portion 45' which serves as a secondary wear ring. A counterbore 50 extends into the adapter, as shown, and receives therein a conventional packing 51 and a lantern ring 52. A gland 53 confines the packing 51 against longitudinal displacement.

Figure 2:
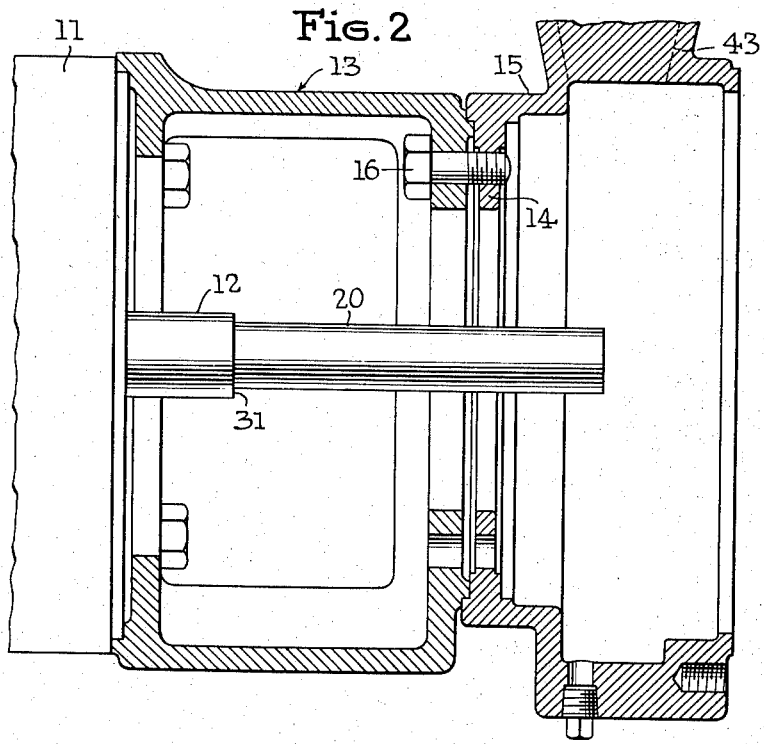
Fig. 2 is a fragmentary side elevation, partly in axial section, showing the parts which remain in assembled relation after the seal assembly has been removed for replacement.

In Fig. 2, the parts of the pump unit which remain permanently in place during replacement of the seal assembly, are shown. These parts include the motor 11, the bracket 13, the pump casing 15 including its discharge connection 43, and the shaft 12. It will be apparent that the alignment of the shaft 12 with the housing 15 is in no way disturbed by removal of the seal assembly. Therefore, the seal assembly can be removed and replaced by relatively unskilled personnel and because of the construction of the seal assembly, the possibility of damage to the seal during installation is minimized. Previous assembly of the seal at the factory insures against improper assembly by inexperienced or untrained personnel in the field.

It will be apparent by reference to Fig. 1, that the removal of the seal can be accomplished quite simply by removal of the coupling section 24. This permits the wear ring 21 to be removed and if necessary, replaced. The cover plate 17 may then be removed by removing the cap screws 18. The locking screw holding the impeller 33 in place on the shaft 12 can be removed, thereby permitting removal of the impeller. Subsequently, the cap screws threaded into the adapter flange 35 can be removed whereby the entire seal assembly, i.e. the adapter 36, the sleeve 28, the rings 37 and 38, and the spring 39 can be removed as a unitary assembly by being axially withdrawn through the opening in the opposite side wall of the casing 15. A new seal assembly may be put in place by carrying the same steps out in the reverse order. Removal and replacement of the seal assembly shown in Fig. 3 is carried out in an identical fashion.

It should be noticed that the sleeves 28 and 28' are identical. This has two significant advantages. One, the manufacturer need only to tool-up to produce a single part and secondly, a sleeve which has been used in a seal assembly of the type shown in Fig. 1, even though it has become scuffed or worn in the region of the ring 38, can be used in a seal of the type shown in Fig. 3, because wear at that point does not affect the sealing surface with which the packing 51 coacts.

What is claimed is:

In a rotary impeller pump of the single inlet type including a casing, an overhung shaft extending into said housing, a first opening in a side wall of the casing encircling said shaft, a second opening larger than the other opening and formed in the opposite side wall of the casing, an impeller insertable through the second opening and fastened to the end of the shaft, and an external cover plate closing said second opening; the improvement which consists in a shoulder provided on said shaft and a seal assembly insertable as a unit through the second opening and comprising an adapter having means thereon for connection with the casing within the impeller cavity formed therein and closing the first side wall opening; a sleeve having a cylindrical outer surface slidable onto the overhung end of said shaft and confined against rotation and longitudinal movement between said impeller and said shoulder, said sleeve being encircled by said adapter; sealing means reacting between the sleeve and the adapter; an encircling sealing surface formed on the inner face of said adapter; and a complementary sealing surface formed on the impeller and forming a running fit with the last-mentioned surface of the adapter in the assembled pump.

References Cited in the file of this patent

UNITED STATES PATENTS

| | | |
|---|---|---|
| 2,384,254 | Meredew | Sept. 4, 1945 |
| 2,661,698 | Schellens | Dec. 8, 1953 |
| 2,700,344 | Schellens | Jan. 25, 1955 |